United States Patent [19]

Hino

[11] Patent Number: 4,517,615
[45] Date of Patent: May 14, 1985

[54] ROTARY HEAD FOR MAGNETIC TAPE RECORD AND PLAYBACK

[75] Inventor: Hiromasa Hino, Tokyo, Japan

[73] Assignee: Fuji Photo Film Co., Ltd., Kanagawa, Japan

[21] Appl. No.: 380,270

[22] Filed: May 20, 1982

[30] Foreign Application Priority Data

May 28, 1981 [JP] Japan ............................. 56-78113[U]
May 28, 1981 [JP] Japan ............................. 56-81429[U]

[51] Int. Cl.$^3$ .......................... G11B 5/52; G11B 21/04
[52] U.S. Cl. ...................................... 360/108; 360/84; 360/130.24
[58] Field of Search ....................... 360/108, 102–103, 360/84, 130.24

[56] References Cited

U.S. PATENT DOCUMENTS 3,981,024 9/1976 Mo et al. ........................ 360/130.24

FOREIGN PATENT DOCUMENTS

| 52-24506 | 2/1977 | Japan . | |
| 52-24507 | 2/1977 | Japan . | |
| 53-130005 | 11/1978 | Japan | 360/130.24 |
| 532893 | 3/1977 | U.S.S.R. | 360/108 |

*Primary Examiner*—John H. Wolff
*Attorney, Agent, or Firm*—Birch, Stewart, Kolasch & Birch

[57] ABSTRACT

A rotary magnetic head assembly for use in recording and playing back video signals including a rotary head drum, a stationary head drum, and magnetic heads. The rotary head drum is supported by a driving shaft and has an outer surface which is generally cylindrical. The rotary drum is rotatable when driven by the shaft. The stationary head drum is disposed coaxially with the rotary drum, and has an outer surface which is generally cylindrical and substantially equal in diameter to the outer surface of the rotary drum. The rotary drum has a first surface opposing the stationary drum with shape formed by a generatrix not perpendicular to the shaft such as a conical or cylindrical. The stationary drum has a second surface opposing the first surface of the rotary drum. The second surface is generally of a shape about the shaft, which is complementary to the first surface to form an air gap between the rotary and stationary head drums through which air flows to form an air film on the outer surfaces of the drums. The magnetic heads are supported on the rotary drum closely to the outer surface of the rotary drum in the gap.

The generatrices may preferably be straight, stepwise or gently curved. Coil windings of a rotary transformer of the first and second surfaces may be mounted in grooves provided on the first and second surfaces, and affixed therein by a fixing agent to preferably form smooth and flat surfaces continuous to the first and second surfaces, respectively.

19 Claims, 6 Drawing Figures

ROTARY HEAD FOR MAGNETIC TAPE RECORD AND PLAYBACK

BACKGROUND OF THE INVENTION

1. Field of the Invention

The present invention relates to magnetic record and playback apparatus, more specifically, to a rotary magnetic head assembly for use in a video taperecorder.

2. Description of the Prior Art

A rotary magnetic head assembly for video taperecorders includes a rotary cylindrical drum supported by a driving shaft driven by a motor, a stationary cylindrical drum coaxially disposed with the rotary drum to form a gap therebetween and having substantially the same exterior diameter as that of the rotary drum, and a plurality of magnetic video heads mounted on the rotary drum in the gap in a predetermined phase relationship with each other.

A rotary magnetic head assembly is often provided with a rotary transformer for establishing an electrical connection with external electronics required for recording and playing back video signals on magnetic tape. Such a rotary transformer includes a plurality of primary windings disposed on the rotary drum coaxially with the drive shaft thereof and interconnected with the respective video heads, and the corresponding plurality of secondary windings mounted on the stationary drum coaxially with the drive shaft of the rotary drum and associated with the respective primary windings to establish a magnetic coupling therewith. Conventionally, the primary windings are provided in one plane, and the secondary windings are in the other plane which opposes closely the one plane.

Recently, video taperecorders, especially, for home use, have become much more compact. However, the relatively larger diameter of magnetic head drums was a bar to that trend. Such a larger diameter of the drums results partially from the fact that in the prior art head drums the coil windings of a rotary transformer were disposed in planes extending perpendicularly to the central axis of the drum cylinders. This becomes more significant in a rotary drum assembly of the type in which a number of, for example, four video heads are provided on a single rotary head drum. With such a type of drum assembly, the provision of an increased number of video heads gives rise to a smaller diameter of the drum mounted with a correspondingly increased number of windings of the rotary transformer.

In the prior art, there is known the type of a rotary head assembly in which a mechanical contact of a surface of magnetic tape with the cylindrical surface of the head drum is minimized by the effect of an "air film" due to the air flow which is produced between opposed surfaces, so as to smooth out the running of the tape with less frictional force. See Japanese Patent Laid-Open Publication Nos. 24506/1977 and 24507/1977, for example. In order to establish such an air flow, there are rotary head assemblies which are provided with a fan or blower, and ones which have a rotary drum with a number of grooves cut generally radially on its surface opposing the stationary drum. Those features result in preventing the assemblies from being miniaturized, and may cause dust and oil to be trapped in those grooves so as to decrease the performance and reliability of the machines. Those difficulties were more critical to video taperecorders for home use, in which further miniaturization and ease of maintenance are required.

In the case of drum assemblies provided with more, for example, four, video heads on a rotary cylinder than conventional ones with two video heads, the cylindrical drum is smaller in diameter and rotates at a higher speed, and the tape contact angle is larger, which is the central angle of a sector of the head drum formed by a portion of the peripheral surface that is in contact with the tape. For example, the contact angle may be more than 270 degrees in the case of a four-head drum assembly. Such a larger contact angle may often disturb the tape from running smoothly to cause visually irritatable jitters to appear in pictures on display. Therefore, simple and compact structure as well as smooth tape running are desired in the field of video taperecorders.

SUMMARY OF THE INVENTION

It is therefore an object of the invention to provide a rotary magnetic head assembly equipped with a number of video heads in a compact structure.

It is another object of the invention to provide a rotary magnetic head assembly on which magnetic tape runs more smoothly without difficulties in reliability and ease of maintenance.

In accordance with the present invention, those objects are accomplished by rotary magnetic head apparatus for use in recording and playing back video signals comprising a rotary head drum supported by a driving shaft and having an outer surface which is generally cylindrical, the drum being rotatable when driven by the shaft, a stationary head drum coaxially disposed with the rotary drum and having an outer surface which is generally cylindrical and substantially equal in diameter to the outer surface of the rotary drum, the rotary head drum having a first surface opposing the stationary drum, the first surface being generally of such a conical shape about the driving shaft as to produce an air flow about on the first surface when driven by the driving shaft, the stationary head drum having a second surface opposing the first surface of the rotary drum, the second surface being generally of a conical or cylindrical shape about the driving shaft, which shape is complementary to the first surface to form a gap between the rotary and stationary head drums, and a plurality of magnetic heads supported on the rotary drum closely to the outer surface of the rotary drum in the gap.

The generatrices of the generally conical or cylindrical shapes may preferably be straight, stepwise or gently curved.

Coil windings of a rotary transformer may be mounted in grooves provided on the first and second surfaces. One group of the windings mounted on the first surface are interconnected to the magnetic heads. Those windings may preferably be affixed in the grooves by a fixing agent to form smooth surfaces continuous to the first and second surfaces, respectively.

Shortcircuit rings may preferably be mounted on the first and second surfaces between adjacent ones of the coil windings on the respective surfaces to electromagnetically shield the windings from each other.

Preferably, the first and second surfaces may generally be of a conical or truncated conical shape about the driving shaft.

The first and second surfaces may be generally of a conical shape but in detail of such a shape that disks having diameters different from each other are stacked stepwise in coaxially with the driving shaft.

The first and second surfaces may also be generally of a cylindrical shape which is complementary to each other between the first and second surfaces.

BRIEF DESCRIPTION OF THE DRAWINGS

The objects and features of the present invention will become more apparent from a consideration of the following detailed description and the accompanying drawings in which.

DESCRIPTION OF THE PREFERRED EMBODIMENTS

Figure 1A:
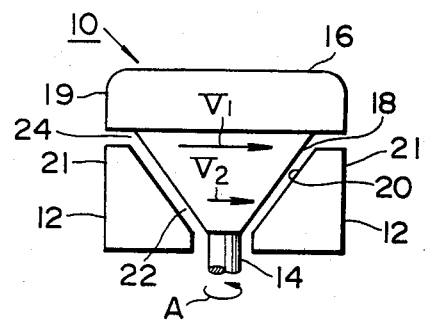
FIGS. 1A and 1B illustrate schematically a rotary magnetic head assembly in accordance with the present invention so as to be useful for understanding the operative principles thereof.
Figure 1B:
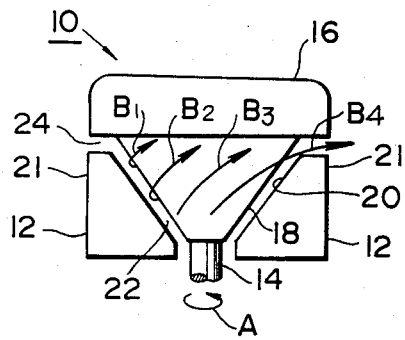

With reference to FIGS. 1A and 1B, a rotary head assembly 10, schematically illustrated, includes a stationary drum 12 and a rotary drum 16. Rotary drum 16 is rigidly supported by a drive shaft 14 which is rotatable by a motor (not shown), and is disposed coaxially with the central axis of stationary drum 12. Stationary and rotary drums 12 and 16 have exterior surfaces 19 and 21, respectively, which are substantially equal in diameter.

In accordance with the present invention, rotary head drum 16 has another exterior surface 18 which is generally of a shape about drive shaft 14 resulting from a generatrix that is substantially not perpendicular to the central axis of drive shaft 14. More specifically, surface 18 is generally conical about shaft 14, or at least of a truncated conical shape, as shown in FIGS. 1A and 1B. Stationary drum 12 has an interior surface 20 which is generally conical or at least of a truncated conical shape which is complementary to generally conical surface 18 of rotary drum 16. In other words, surface 20 is also generally of a resulting from a generatrix which is substantially not perpendicular to the central axis of drive shaft 14 to form a thin gap 22 between generally conical surfaces 18 and 20.

While rotary drum 16 is driven by drive shaft 14 in the direction of an arrow A, difference occurs in line velocity of the rotation along the periphery of conical surface 18 between the upper and lower portions thereof, as depicted in FIG. 1A by arrows V1 and V2. As shown in FIG. 1B by arrows B1 through B4, an air flow occurs upwards in gap 22 and blows out from slit 24 formed between stationary and rotary drums 12 and 16, as shown by arrow B4, for example. The amount of the air thus emerging from slit 24 is dependent upon the diameters and the differences in diameter of conical surfaces 18 and 20, together with the speed of rotation of rotary drum 16.

Figure 2:
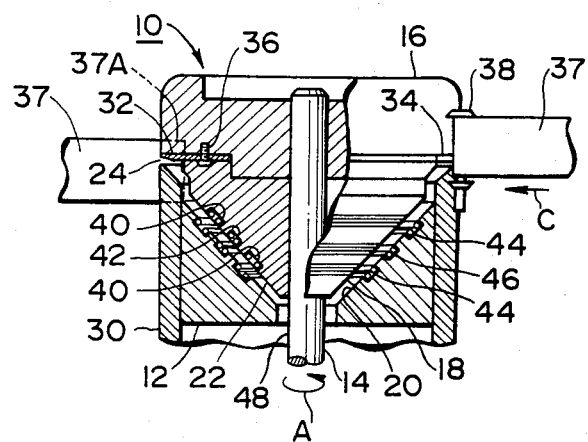
FIG. 2 is a partially cut out, cross sectional side view showing an embodiment of the rotary magnetic head assembly in accordance with the invention.

In FIG. 2, there is shown an embodiment of a two-head rotary magnetic head drum assembly in accordance with the present invention for use in video taperecorders. In the figures, the like components are designated by the same reference numerals. In the arrangement illustrated in FIG. 2, stationary drum 12 is supported by a cylindrical casing 30. On an annular plane of rotary drum 16 which defines one end of slit 24 and is substantially perpendicular to the central axis of drive shaft 14, two magnetic video heads 32 and 34 are mounted by means of screws 36, for example, with the phase difference of 180 degrees from each other provided in the circumferential direction of drum 16, as shown in FIG. 2.

Along the outer peripheries of drum 16 and casing 30, tape guide poles 38 are provided which make tape 37, when loaded thereon, contact with the peripheries of drum 16 and casing 30 by means of a tension regulator (not shown). For simplicity in the figure, one of poles 38 is not shown, and a portion of tape 37 that is located at the position of the other of guide poles 38 is depicted by a dotted line 37A. Thus, while rotary drum 16 is driven by driving shaft 14 in the direction of arrow A for recording or playback, tape 37 runs in the direction of arrow C from right guide pole 38 around the back portion, in FIG. 2, of the circumference of drum 16 and casing 30 to the left in the figure.

Conical surfaces 18 and 20 of rotary and stationary head drums 16 and 12 are, respectively, provided thereon with grooves 40, 42, and 44, 46. In grooves 40 and 44, coil windings of a rotary transformer are mounted, while in grooves 42 and 46, shortcircuit rings are mounted which are made of an electrically conductive material to magnetically shield the windings from each other. The windings and shortcircuit rings constitute a rotary transformer which electrically couples video heads 32 and 34 to external electronics for processing video signals. Those windings and rings may preferably be affixed in the respective grooves by means of a fixing agent, such as resin, or adhesive, to form a smooth and continuous portion of respective conical surfaces 18 and 20 of head drums 16 and 12, respectively.

In operation, when recording or playing back, rotary drum 16 is driven in the direction of arrow A to produce an air flow directed from the bottom to the top in thin, conical gap 22 due to the difference in line velocity of the rotation, as discussed earlier. Air is therefore blown out from slit 24. Tape 37 runs in the direction of arrow C by means of driving mechanism (not shown) with tension applied thereto via guide poles 38 by a tension regulator mechanism (not shown) so as to be almost in contact with the peripheries of drum 16 and casing 30. Due to an "air film" effect accomplished by the air blown out from slit 24, however, a small air space of several micrometers thick is produced between the recording surface of tape 37 and the peripheral surfaces of drum 16 and casing 30. The thickness of the air space thus produced may be adjustable by adjustments of the tension regulator.

The above-mentioned structure will make it possible for tape 37 to run more smoothly without friction, even when tape 37 travels around a longer path on the circumferential surfaces of drum 16 and casing 30 as in the case of a four-head drum assembly, for example, in other words, even in the case of a larger central angle formed about the central axis of drum assembly 10 by a portion of the peripheral surfaces of drum 16 and casing 30 which are almost in contact with tape 37. If the amount of air flow were not sufficient to establish a complete air film effect, a fan or blower (not shown) might be additionally provided in a location near the lower portion 48 of drive shaft 14 to assist in providing a larger amount of air in flowing.

Figure 3:
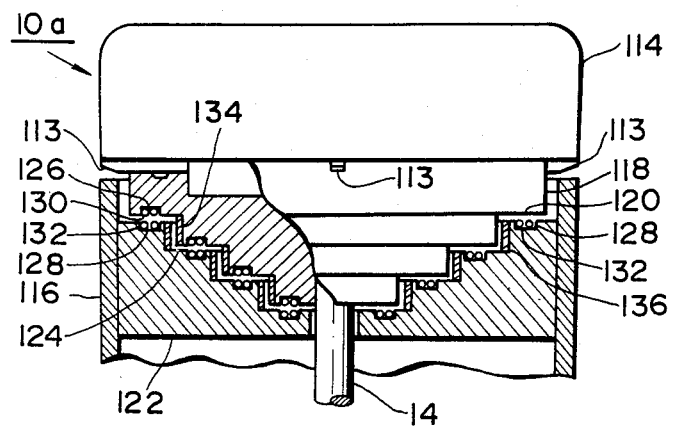
FIG. 3 is also a partially cut out, cross sectional side view depicting another embodiment of the head assembly in accordance with the invention.

With reference to FIG. 3, which shows in a partially cut out, cross sectional view another embodiment of rotary magnetic head assembly 10a in accordance with the invention, assembly 10a includes a rotary drum 114, which is generally of a cylindrical shape and rigidly mounted on a drive shaft 14 which is rotatable by a motor (not shown), and a stationary drum 116, which is generally cylindrical also and disposed coaxially with the central axis of drive shaft 14. Rotary drum 114 has four magnetic video heads 113 mounted with the phase difference of 90 degrees provided from each other, and has a lower portion 118 which is generally of a conical shape defined by the peripheral edges of rather thick disks or thin cylinders having diameters different from each other which are stepwise stacked coaxially with the central axis of drive shaft 14 to form coaxial, circular steps 120, as shown in FIG. 3. Likewise, stationary drum 116 has a corresponding inner portion 122, which is generally of a conical shape complementary to steps 120 but in detail forms circular steps 124 that are coaxial with each other to form a thin, generally conical air gap or space with respect to circular steps 120 of rotary drum 114. Thus, steps 120 and 124 collectively form generally conical opposed surfaces separated by an air gap.

The horizontal annular surfaces of steps 120 and 124 have circular grooves 126 and 128 cut, respectively, therein in coaxially with the axis of driving shaft 14. In grooves 126, there are arranged one group of coil windings 130, and in grooves 128, the other group of coil windings 132, both of which are fixed therein by a fixing agent, such as resin or adhesive, to form flat and continuous surfaces of those steps. Windings 130 and 132 are electromagnetically coupled with each other to form a rotary transformer electrically interconnecting video heads 113 to external electronics (not shown) for the video head system. The vertical cylindrical walls of annular steps 120 and 124 may preferably have electrically conductive rings 134 and 136 mounted respectively thereon between respectively adjacent coil windings 130 and 132 to electromagnetically separate those windings from each other. In the case of a drum assembly in which the vertical walls of cylindrical steps 120 and 124 are sufficiently high not to complete a magnetic circuit including adjacent ones of windings 130 and 132, however, it is not necessary to provide such shortcircuit rings.

In the embodiment of the invention illustrated in FIG. 3, the outer surface of rotary drum 114 is generally of a conical shape so as to produce an air flow, similarly to the illustrative embodiment discussed with reference to FIG. 2, to provide an air film effect. In addition, since coil windings 130 and 132 are spaced from each other in a direction parallel to the longitudinal axis of head assembly 10a, it is possible to design head drums 114 and 116 which are smaller in diameter.

Figure 4:
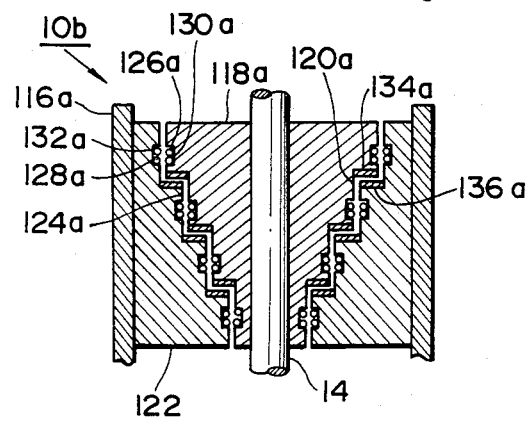
FIGS. 4 and 5 are end cross sectional views illustrating schematically other embodiments of the head assembly in accordance with the invention.

Now referring to FIG. 4, in which similar components are designated by the same reference numerals as in FIG. 3, there is shown schematically still another embodiment of the present invention. For simplicity in FIG. 4, only lower portion 118a is shown with respect to the rotary drum. Different from head assembly 10a shown in FIG. 3, assembly 10b shown in FIG. 4 has a rotary transformer including windings 130a and 132a mounted in grooves 126a and 128a, which are respectively cut into the vertical walls of cylindrical steps 120 and 124. Shortcircuit rings 134a and 136a may therefore be of a flat annular shape, as shown, and are not necessary also in the case of windings 130a and 132a spaced sufficiently from each other. In this illustrative embodiment, windings 130a and 132a may be spaced by a shorter distance in the horizontal direction than head assembly 10a shown in FIG. 3, so that drums 116a and 118a may be designed smaller in diameter. Since the rotary drum also has such a generally conical portion 118a including steps 120a, it is possible to obtain a sufficient air flow throughout the thin gap between steps 120a and 124a to establish an air film effect.

Figure 5:
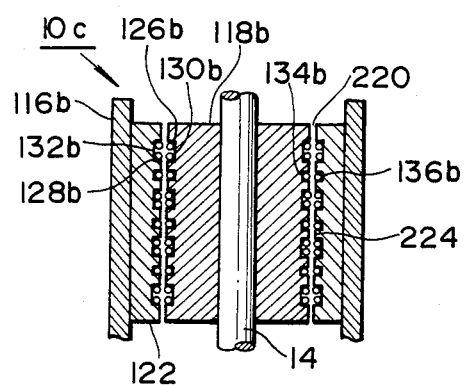

With reference to FIG. 5, shown is another embodiment in accordance with the invention, in which a lower portion 118b of the rotary drum is generally of a cylindrical shape having grooves 126b cut in its cylindrical periphery 220, and complementarily inner surface 224 of stationary drum 116b is generally of a cylindrical shape on which grooves 128b are cut, as shown in the figure. For simplicity in FIG. 5, only lower portion 118b is shown with regard to the rotary drum. In grooves 126b and 128b thus provided in cylindrical surfaces 220 and 224, coil windings 130b and 132b are respectively mounted in such a manner that adjacent ones of the windings are separated by shortcircuit rings 134b and 136b, respectively, which are also mounted in some of grooves 126b and 128b. In this illustrative embodiment, windings 130b and 132b, which have substantially the same winding diameter, respectively, are arranged in the longitudinal direction of drums 116b and 118b, so that drum assembly 10c may be designed smaller in diameter. It is to be noted that rings 134b and 136b may not necessarily be provided if windings 130b and 132b are sufficiently spaced from each other, respectively, not to interfere with each other.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

With respect to the relationships in rotation between both head drums, for example, it is possible to apply the invention to a head assembly which has a rotatable middle or intermediate drum, rather than a rotatable upper drum as in the illustrative embodiments. Also in the embodiment shown in FIG. 2, drum surfaces 18 and 20 are generally of a conical or truncated conical shape, of which the generatrix is a straight line. Any other shape may be applicable which is formed by a body of revolution with its generatrix curved gently so as to effect differences in line velocity between the upper and lower portions of the revolutionary body.

Although the present invention is described with reference to the illustrative embodiments of two-magnetic head and four-magnetic head assemblies, it is to be appreciated for the invention to be applicable to assemblies having other number of magnetic heads.

What is claimed is:
1. Rotary magnetic head apparatus for use in recording and playing back video signals comprising:
   a rotary head drum supported by a driving shaft and having an outer surface which is generally cylindrical, said drum being rotatable when driven by the shaft;
   a stationary head drum coaxially disposed on an axis aligned with said driving shaft and having an outer surface which is generally cylindrical and substan- tially equal in diameter to said outer surface of the rotary drum;

said rotary head drum having a first surface means opposing the stationary drum, the first surface means being generally of such a conical shape about the driving shaft and of a sufficient length longitudinally of the shaft as to produce air flow along the first surface means onto the outer surface of the rotary drum to form an air film on said outer surface in response to rotation of the driving shaft;

said stationary head drum having a second surface opposing the first surface of the rotary drum, the second surface being generally of a conical shape about the driving shaft, which shape is complementary to the first surface to form gap means between said rotary and stationary head drums for directing said air flow to the outer surfaces thereof to form an air film thereon; and a plurality of magnetic heads supported on said rotary drum closely to the outer surfaces of the rotary and stationary drums in the gap means.

2. Rotary magnetic head apparatus for use in recording and playing back video signals comprising:

a rotary head drum supported by a driving shaft and having an outer surface which is generally cylindrical, said drum being rotatable when driven by the shaft;

a stationary head drum coaxially aligned with said driving shaft and having an outer surface which is generally cylindrical and substantially equal in diameter to said outer surface of the rotary drum;

said rotary head drum having first surface means opposing the stationary drum, the first surface means being generally of such a truncated conical shape about the driving shaft and of a sufficient length longitudinally of the shaft as to produce air flow along the first surface means onto the outer surface of the rotary drum to form an air film on said outer surface in response to rotation of the driving shaft;

said stationary head drum having a second surface opposing the first surface of the rotary drum, the second surface being generally of a truncated conical shape which is complementary to the first surface to form gap means between said rotary and stationary head drums for directing said air flow to the outer surfaces thereof to form an air film thereon; and a plurality of magnetic heads supported on said rotary drum closely to the outer surface of the rotary and stationary drums in the gap means.

3. Apparatus in accordance with claim 2, wherein said rotary head drum has a plurality of first grooves provided on the first surface in the circumferential direction of the first surface, said stationary head drum having a corresponding plurality of second grooves provided on the second surface in the circumferential direction of the second surface, the second grooves being located to oppose substantially the respective first grooves, said apparatus further comprising a plurality of first windings each mounted in the respective first grooves and interconnected to the respective magnetic heads, and a corresponding plurality of second windings each mounted in the respective second grooves to form a rotary transformer for the magnetic heads in conjunction with the first windings.

4. Apparatus in accordance with claim 3, wherein said first and second windings are affixed by a fixing agent in the first and second grooves, respectively, to form smooth surfaces which are continuous to the first and second surfaces, respectively.

5. Apparatus in accordance with claim 3, further comprising first means provided on the first surface for electromagnetically shielding said first windings from each other, and second means provided on the second surface for electromagnetically shielding said second windings from each other.

6. Apparatus in accordance with claim 5, wherein said first means comprises a first electrically conductive ring mounted in a third groove provided on the first surface between adjacent ones of the first grooves, said second means comprising a second electrically conductive ring mounted in a fourth groove provided on the second surface between adjacent ones of the second grooves.

7. Apparatus in accordance with claim 6, wherein said first and second rings are affixed by a fixing agent in the third and fourth grooves, respectively, to form smooth surfaces which are continuous to the first and second surfaces, respectively.

8. Apparatus in accordance with claim 2, wherein said first surface is oriented with a larger portion in diameter of the at least truncated conical shape thereof contiguous to the outer surface of said rotary head drum and with the top portion of the at least truncated conical shape thereof contiguous to the driving shaft, said second surface being oriented with a larger portion in diameter of the at least truncated conical shape thereof contiguous to the outer surface of said stationary head drum.

9. Apparatus in accordance with claim 2, wherein said first and second surfaces have a generatrix which is substantially straight.

10. Apparatus in accordance with claim 2, wherein said first and second surfaces are defined by the peripheral edges of disks having diameters different from each other stacked stepwise coaxially with the drive shaft.

11. Apparatus in accordance with claim 10, wherein said rotary head drum has a plurality of first grooves each provided on a wall of the disks which is substantially parallel to the driving shaft, said stationary head drum having a corresponding plurality of second grooves each provided on a wall of the disks which is substantially parallel to the driving shaft, said apparatus further comprising a plurality of first windings each mounted in the respective first grooves and interconnected to the respective magnetic heads, and a corresponding plurality of second windings each mounted in the respective second grooves to form a rotary transformer for the magnetic heads in conjunction with the first windings.

12. Apparatus in accordance with claim 11, wherein said first and second windings are affixed by a fixing agent in the first and second grooves, respectively, to form smooth surfaces which are continuous to the first and second surfaces, respectively.

13. Apparatus in accordance with claim 11 or 12, further comprising a first electrically conductive ring mounted on a surface of the disks of said rotary head drum, which surface is substantially perpendicular to the driving shaft between adjacent ones of said first windings, and a second electrically conductive ring mounted on a surface of the disks of said stationary head drum, which surface is substantially perpendicular to the driving shaft between adjacent ones of said second windings.

14. Apparatus in accordance with claim 10, wherein said rotary head drum has a plurality of first grooves each provided on a surface of the disks which is substantially perpendicular to the driving shaft, said stationary head drum having a corresponding plurality of second grooves each provided on a surface of the disks which is substantially perpendicular to the driving shaft, said apparatus further comprising a plurality of first windings each mounted in the respective first grooves and interconnected to the respective magnetic heads, and a corresponding plurality of second windings each mounted in the respective second grooves to form a rotary transformer for the magnetic heads in conjunction with the first windings.

15. Apparatus in accordance with claim 14, wherein said first and second windings are affixed by a fixing agent in the first and second grooves, respectively, to form smooth surfaces which are continuous to the first and second surfaces, respectively.

16. Apparatus in accordance with claim 14 or 15, further comprising a first electrically conductive ring mounted of a wall of the disks of said rotary head drum, which surface is substantially parallel to the driving shaft between adjacent ones of said first windings, and a second electrically conductive ring mounted on a wall of the disks of said stationary head drum, which surface is substantially parallel to the driving shaft between adjacent ones of said second windings.

17. Rotary magnetic head apparatus for use in recording and playing back video signals comprising:
   a rotary head drum supported by a driving shaft and having an outer surface which is generally cylindrical, said drum being rotatable when driven by the shaft;
   a stationary head drum coaxially aligned with said driving shaft and having an outer surface which is generally cylindrical and substantially equal in diameter to said outer surface of the rotary drum;
   said rotary head drum having a first surface opposing the stationary drum, the first surface being generally cylindrical about the driving shaft and smaller in diameter than the outer surface of the rotary drum;
   said stationary head drum having a second surface opposing the first surface of the rotary drum, the second surface being generally of a cylindrical shape which is complementary to the first surface to form a gap between said rotary and stationary head drums;
   a plurality of magnetic heads supported on said rotary drum closely to the outer surface of the rotary drum in the gap;
   said rotary head drum having a plurality of first grooves provided on the first surface in the circumferential direction of the first surface;
   said stationary head drum having a corresponding plurality of second grooves provided on the second surface in the circumferential direction of the second surface, the second grooves being located to oppose substantially the respective first grooves;
   a plurality of first windings each mounted in the respective first grooves and interconnected to the respective magnetic heads; and
   a corresponding plurality of second windings each mounted in the respective second grooves to form a rotary transformer for the magnetic heads in conjunction with the first windings.

18. Apparatus in accordance with claim 17, wherein said first and second windings are affixed by a fixing agent in the first and second grooves, respectively, to form smooth surfaces which are continuous to the first and second surfaces, respectively.

19. Apparatus in accordance with claim 18, further comprising a first electrically conductive ring mounted in a third grooves provided on the first surface between adjacent ones of the first grooves, and a second electrically conductive ring mounted in a fourth groove provided on the second surface between adjacent ones of the second grooves.

* * * * *